No. 874,770. PATENTED DEC. 24, 1907.
H. G. HURST & W. H. ROTH.
TWINE HOLDER FOR BINDING CORN, GRAIN, &c.
APPLICATION FILED JUNE 20, 1907.

Witnesses

Inventors
Henry G. Hurst and
William H. Roth
by
Attorneys

UNITED STATES PATENT OFFICE.

HENRY G. HURST AND WILLIAM H. ROTH, OF OZORA, MISSOURI.

TWINE-HOLDER FOR BINDING CORN, GRAIN, &c.

No. 874,770.  Specification of Letters Patent.  Patented Dec. 24, 1907.

Application filed June 20, 1907. Serial No. 379,964.

*To all whom it may concern:*

Be it known that we, HENRY G. HURST and WILLIAM H. ROTH, citizens of the United States, residing at Ozora, in the county of Ste. Genevieve and State of Missouri, have invented certain new and useful Improvements in Twine-Holders for Binding Corn, Grain, &c.; and we do declare the following to be a full, clear, and exact description of the invention, such as will enable others skilled in the art to which it appertains to make and use the same.

My invention has relation to new and useful improvements in twine holders for binding corn, grain, etc., and has for its object the production of a simple and economical device for holding the ends of a piece of twine used to bind corn fodder or the like.

With the foregoing and other objects in view, the invention consists of certain novel features of construction, combination and arrangement of parts, as will be more fully described and particularly pointed out in the appended claims.

Figure 1:
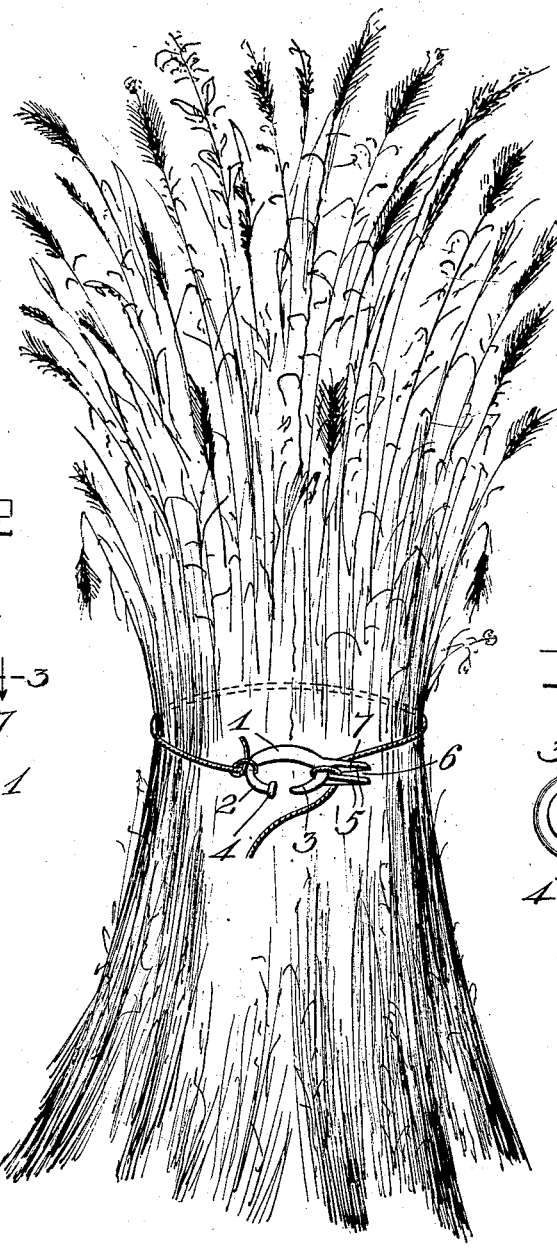
Figure 2:
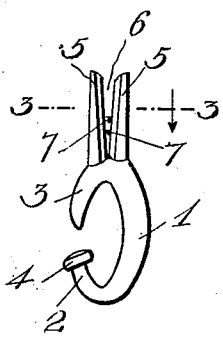
Figure 3:
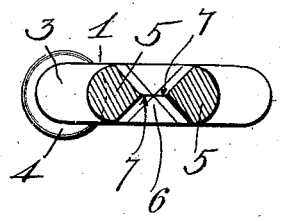

In the accompanying drawings,—Figure 1 is a perspective view of the holder applied to a bundle of grain; Fig. 2 is a central longitudinal sectional view; and Fig. 3 is a cross sectional view taken through the holding fingers.

In accordance with the invention, and as shown in the drawings, the holder 1 is cast from one piece of suitable metal, and comprises a body of substantially elliptical form, having a substantially central opening in one side, leaving inwardly curved guard fingers 2 and 3, respectively, said finger 2 terminating in an enlargement or head 4, the purpose of which will be disclosed. Two longitudinally disposed holding fingers 5 extend outwardly from the end of said body opposite said guard finger 2, and diverge at a suitable angle from their inner ends, leaving a wedge-shaped space 6 therebetween. The inner sides of said holding fingers are beveled to provide sharp inner edges 7, adapted to engage a piece of twine or other flexible material.

In the application of the invention, the twine is fastened at one end to the end of the body adjacent said guard finger 2, is passed or wrapped around the fodder or other bundle to be tied, and is then passed between said guard fingers; and after being pulled sufficiently tight, its free end is passed between said longitudinally disposed holding fingers, which holds said ends securely in position. The enlargement or head 4 of said guard finger 2 prevents one end of the twine from slipping off.

From the foregoing description, taken in connection with the accompanying drawings, the construction and operation of the invention will be readily understood without requiring a more extended explanation.

Having described our invention, we claim:—

A device for securing the free ends of a flexible binder comprising an elliptical body open to form engaging hooks at each end of the major diameter of said body, a pair of diverging fingers secured to one of said hooks and extending substantially parallel to a line through the major diameter of the body, said fingers being wedge-shaped in cross section and disposed in close proximity to each other.

In testimony whereof we have hereunto set our hand in presence of two subscribing witnesses.

HENRY G. HURST.
WILLIAM H. ROTH.

Witnesses:
JOHN F. BARTELS,
WALTER L. SCHAAF.